United States Patent [19]

Golden

[11] Patent Number: 5,095,495

[45] Date of Patent: Mar. 10, 1992

[54] USE OF CYCLOSTATIONARY SIGNAL TO CONSTRAIN THE FREQUENCY RESPONSE OF A FRACTIONALLY SPACED EQUALIZER

[75] Inventor: Glenn D. Golden, Tinton Falls, N.J.

[73] Assignee: AT&T Bell Laboratories, Murray Hill, N.J.

[21] Appl. No.: 576,881

[22] Filed: Sep. 4, 1990

[51] Int. Cl.[5] .............................................. H04B 3/04
[52] U.S. Cl. ........................................ 375/14; 333/18
[58] Field of Search ............... 375/12, 14, 16; 333/18, 333/28; 364/724.2

[56] References Cited

U.S. PATENT DOCUMENTS

| | | | |
|---|---|---|---|
| 4,247,940 | 1/1981 | Mueller et al. | 375/16 |
| 4,376,308 | 3/1983 | McNair | 375/14 |
| 4,384,355 | 5/1983 | Werner | 375/14 |
| 4,422,175 | 12/1983 | Bingham et al. | 375/14 |
| 4,467,441 | 8/1984 | Gritton | 375/14 |

Primary Examiner—Benedict V. Safourek
Attorney, Agent, or Firm—Ronald D. Slusky

[57] ABSTRACT

Coefficient drift, in fractionally-spaced equalizers, is constrained by combining a received data signal with a cyclostationary signal of the same symbol rate as the received data signal.

25 Claims, 5 Drawing Sheets

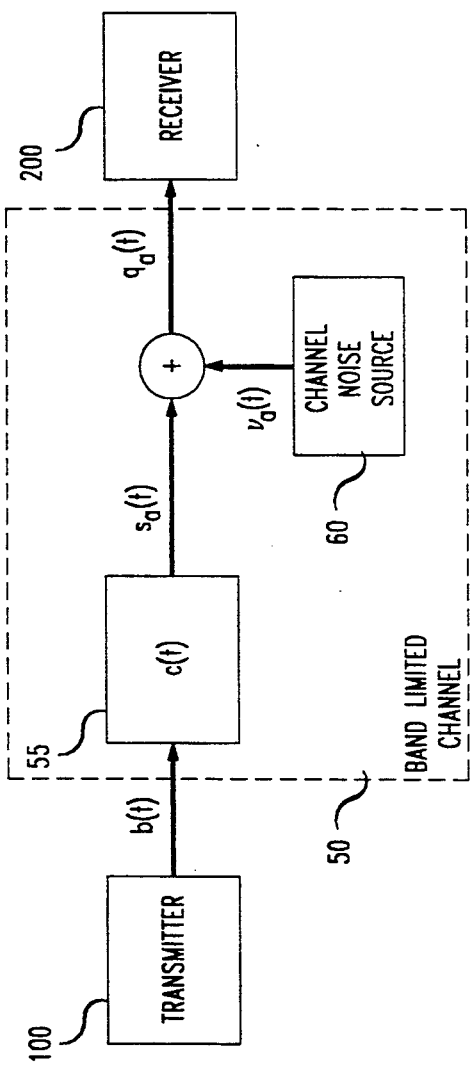

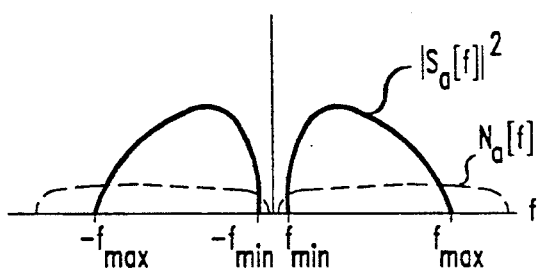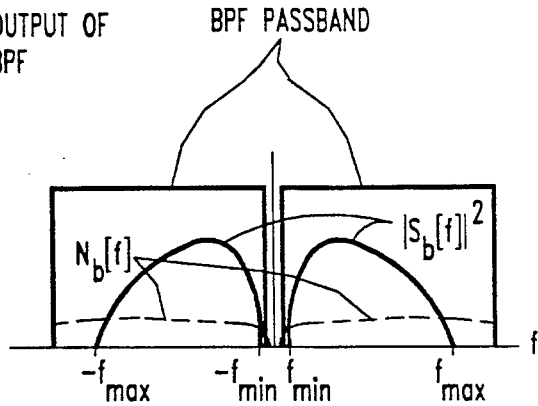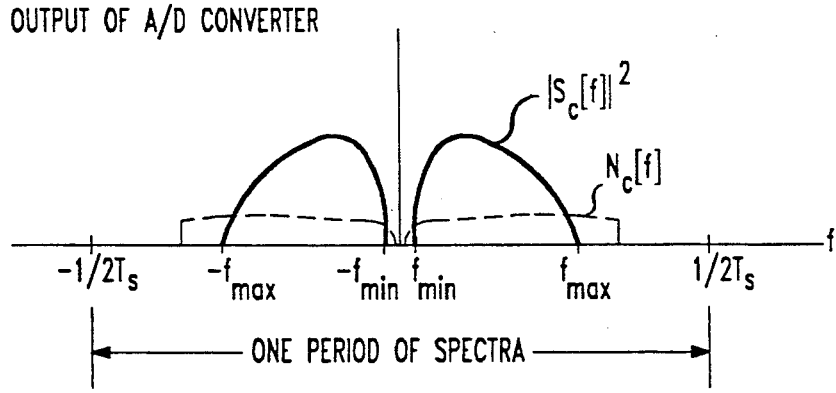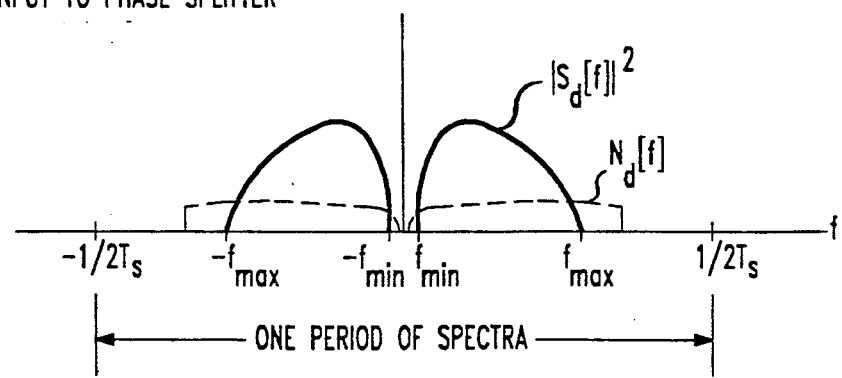

FIG. 8
OUTPUT OF PHASE SPLITTER
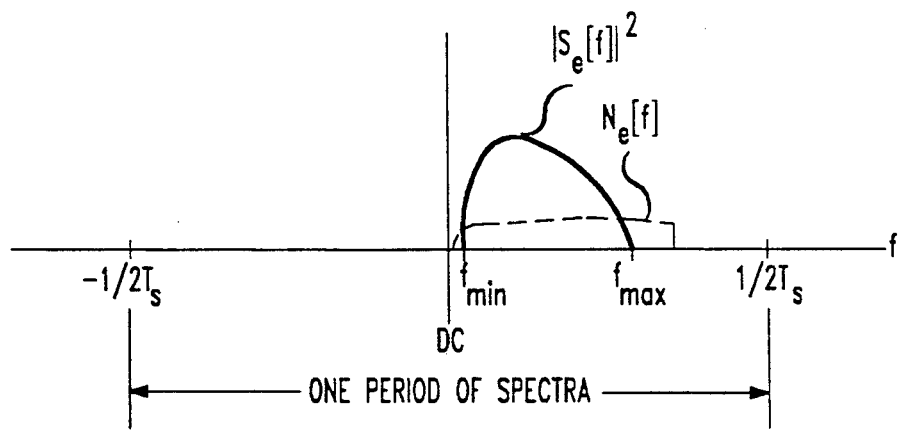
FIG. 9  SPECTRA AT INPUT TO FRACTIONALLY-SPACED EQUALIZER
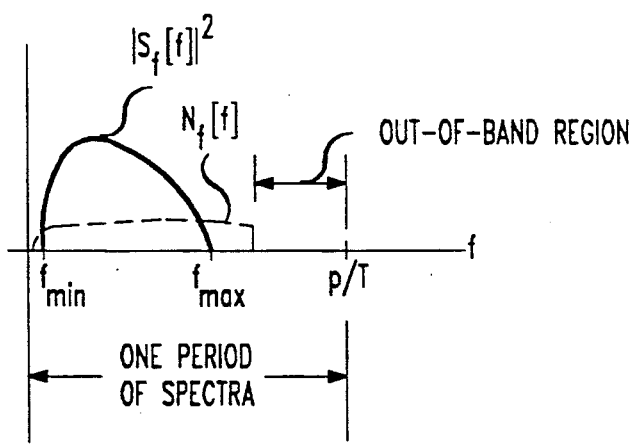
FIG. 10
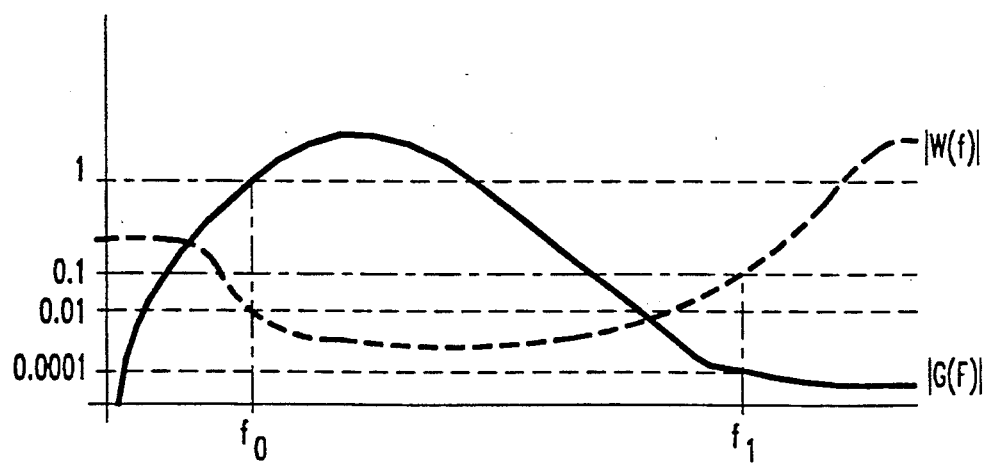

USE OF CYCLOSTATIONARY SIGNAL TO CONSTRAIN THE FREQUENCY RESPONSE OF A FRACTIONALLY SPACED EQUALIZER

BACKGROUND OF THE INVENTION

The present invention relates to adaptive equalizers which can be utilized in data transmission systems to compensate for the amplitude and delay distortion that is present in many communication channels.

Adaptive equalizers are necessary for accurate reception of high-speed data signals transmitted over band-limited channels with unknown transmission characteristics. The equalizer is generally in the form of a transversal filter in which a sampled signal comprised of samples of an analog data signal is multiplied by respective tap coefficients. The resulting products are added together to generate an equalizer output which is then used to form an estimate of the transmitted data. In addition, an error signal is formed equal to the difference between the equalizer output and the estimate of the transmitted data. This error signal is used to update the tap coefficient values in such a way as to minimize both the noise and distortion—primarily intersymbol interference—introduced by the channel. The most commonly used error-directed tap coefficient updating algorithm is the so-called least-mean-squared (LMS) algorithm, which adjusts the tap coefficients so as to minimize the mean-squared error (MSE)—the average of the value of the square of the error signal.

Many high-speed data receivers incorporate a synchronous, or baud, equalizer in which the analog data signal is sampled at a rate equal to the symbol rate. It is, however, possible to use a so-called fractionally spaced equalizer in which the analog data signal is sampled at a rate higher than the symbol rate. Data decisions, i.e., quantizations of the equalizer outputs, are still made at the symbol rate. However, the fact that equalization is carried out using a finer sampling interval provides the fractionally spaced equalizer with significant advantages over its more conventional cousin. Most notable among these is insensitivity to channel delay distortion.

There is, however, at least one significant problem unique to the fractionally spaced equalizer. In a synchronous equalizer one set of tap coefficients is clearly optimum, i.e., provides the smallest mean-squared error. By contrast, in the fractionally spaced equalizer, many sets of tap coefficient values provide approximately the same mean-squared error. As a consequence of this property, the presence of small biases in the tap coefficient updating processing—such as arithmetic biases associated with signal value round off—can cause at least some of the tap coefficient values to slowly 'drift' to ever-larger levels, even though the mean-squared error remains at, or close to, its minimum value. The registers used to store the tap coefficients or other signals generated during normal equalizer operation may eventually overflow, causing severe degradation, or total collapse, of the system response.

The prior art, as exemplified in U.S. Pat. Nos. 4,237,554 and 4,376,308, teaches two alternative approaches to solving the problem of tap coefficient drift. Specifically, U.S. Pat. No. 4,237,554, issued Dec. 2, 1980 to Gitlin et al., teaches that tap coefficient drift can be constrained, i.e. reduced to acceptable levels, by use of a "tap leakage algorithm" in which a constant magnitude term is factored into the tap coefficient update algorithm in order to control the magnitude of the tap coefficient values. However this solution requires additional processing power in the equalizer in order to implement the operations which comprise the tap-leakage algorithm. Its use may not even be possible in some situations, e.g. in cases where it is desirable to implement the equalizer using an existing 'off-the-shelf' VLSI component, whose internal algorithm cannot be modified. Alternatively, U.S. Pat. No. 4,376,308, issued Mar. 8, 1983 to B. McNair, teaches that tap coefficient drift can also be constrained by the injection of an additional signal, derived from the analog data signal into the "out-of-band" frequency region of a fractionally spaced equalizer. Specifically, a composite signal is formed from the analog data signal and the additional signal, whereby equalization of the composite signal constrains the tap coefficient drift of the equalizer. Although providing an alternative approach, this technique requires a fairly sharp filter to constrain the additional signal to the out-of-band region. A sharp filter is essential because any energy appearing in the fractionally spaced equalizer's "in-band" frequency region, from this additional signal, will increase the mean-squared error. As a result, due to the necessity of using sharp filters, considerable additional processing power or hardware is also required.

SUMMARY OF THE INVENTION

In the above-mentioned prior art, both solutions to the problem of tap coefficient drift involve significant additional processing power or hardware, and one solution requires modifying a fractionally spaced equalizer's tap coefficient update algorithm. However, I have devised a technique to constrain the tap coefficient drift in a fractionally spaced equalizer which requires considerably less processing power than the prior art solutions, and requires no modification to the equalizer's update algorithm. Specifically, I have realized that a cyclostationary signal, frequency synchronous to a data signal, can be present in both the in-band and out-of-band regions of a fractionally spaced equalizer without significantly increasing the mean-squared error, as long as the energy of the cyclostationary signal in the in-band region is less than its energy in the out-of-band region. This requirement can be met using filters which are simpler, i.e. require less processing power, than the sharp filters which are used to substantially restrict the energy to only the out-of-band region. Therefore, in accordance with the invention, tap coefficient drift in a fractionally spaced equalizer can be constrained by equalization of a composite signal which is formed by combining a data signal with a frequency synchronous cyclostationary signal having energy in at least the out-of-band frequency region, and where the energy of the cyclostationary signal in the in-band region is less than the energy in the out of band region.

In some communication systems, the roll-off factor, $\beta$, of a data signal may have to be taken into account in forming the composite signal. Therefore, in accordance with a feature of the invention, the composite signal is formed by combining the data signal with a frequency synchronous cyclostationary signal having energy in both the non-roll-off frequency region of the data signal and the out-of-band frequency region of the equalizer region.

In accordance with another feature of the invention, the energy of the frequency synchronous cyclostationary signal can be substantially restricted to the out-ofband region. Although sharp filtering of the cyclostationary signal would be required in this case, an overall reduction in processing power is still realized.

BRIEF DESCRIPTION OF THE DRAWING

The invention may be understood from a consideration of the following detailed description and accompanying drawing in which:

FIG. 1 is a block diagram of an illustrative communications system embodying the principles of the invention;

FIG. 2 is a block diagram of an illustrative transmitter used in the system of FIG. 1 for generating a data signal for transmission over a band-limited channel;

FIGS. 4–9 are a set of representative signal power vs. frequency plots, helpful in explaining the operation of fractionally spaced equalizers and, in particular, the tap coefficient drift phenomenon which arises therein;

FIG. 10 is an illustrative signal amplitude vs. frequency plot helpful in explaining the operation of a fractionally spaced equalizer in response to a synchronous cyclostationary signal input in accordance with the invention.

DETAILED DESCRIPTION

Figure 3:
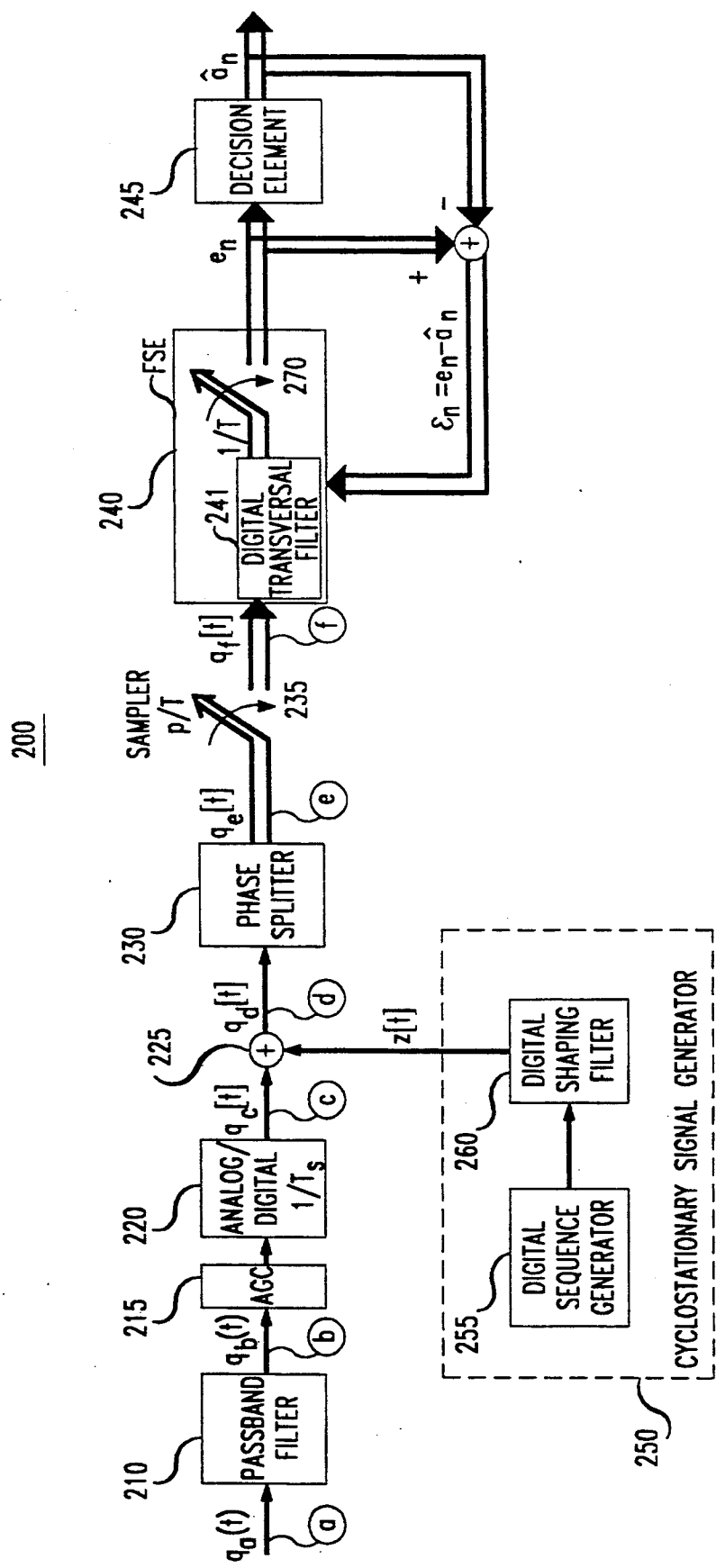
FIG. 3 is a block diagram of an illustrative receiver used in the system of FIG. 1 embodying the principles of the invention.

FIG. 1 shows an illustrative communication system wherein a data signal, generated by transmitter 100, is transmitted over band-limited channel 50 for reception at receiver 200. The data signal generated by transmitter 100 is, illustratively, a carrierless quadrature amplitude modulated (CQAM) data signal. For the purposes of this example, using CQAM modulation (as opposed to the more conventional QAM) allows the use of a somewhat simpler receiver structure. It is well known that CQAM is equivalent, under nearly all conditions of interest, to conventional QAM. It is implemented differently, however; in conventional QAM, the transmitted signal is formed as a baseband signal which is then modulated by a so-called 'carrier' to create a passband signal for transmission. In CQAM, the transmitter simply forms the signal in passband directly, and without modulating the complex transmitted symbols prior to filtering. Thus, the corresponding CQAM receiver structure to be illustrated in receiver 200 is somewhat simpler than the conventional QAM structure because there is no need for the explicit demodulation of the equalizer output, and the need to deal notationally with the carrier term is eliminated.

The symbol rate of transmitter 100 is $1/T$ symbols per second. In FIG. 2, data source 10 illustratively provides a data stream to transmitter 100, at $m/T$ bits per second. During each symbol interval, m bits are received by encoder 20 and are mapped into one of $2^m$ complex 'symbol' values $a_n$. The set of all possible transmitted symbol values $\{a_n\}$ is known as the 'constellation'. The sequence of complex symbol values; generated by encoder 20 at $1/T$ symbols per second, is then filtered by (i.e. convolved with) complex-valued passband filter 30. (It should be understood that complex numbers are represented in the actual signal processing hardware or software by pairs of real numbers, and that mathematical operations on complex numbers are performed using the ordinary operations used on real numbers, except according to the rules of complex arithmetic. No special hardware or software is required for dealing with complex numbers. In the FIGS., complex-valued signals are represented by two parallel lines, and real valued signals by a single line).

Passband filter 30 is an analytic filter, so called because its transfer function is zero (or negligible) for all negative frequencies. The passband of filter 30 has bandwidth $(1+\beta)/T$ Hz, where $\beta > 0$. The parameter $\beta$ is sometimes referred to as the 'excess bandwidth' of the signal, or the 'roll-off factor', since it represents the fraction in excess of the Nyquist bandwidth, $1/T$ Hz, the theorectical minimum bandwidth required for distortionless transmission. It is assumed that passband of filter 30 coincides with the positive portion of the nominal channel passband.

The output of passband filter 30 is the complex analytic signal $y(t)$. A complex-valued signal such as $y(t)$ cannot be directly transmitted over a real-valued channel. However, a property of analytic signals is that either the real or the imaginary portion alone is sufficient to allow recovery of the entire complex signal. By convention, the real part of signal $y(t)$ is chosen to be converted to an analog voltage by digital-to-analog converter (D/A) 40. The output from D/A 40 is applied to low pass filter 45 to remove the undesired portions of the periodic spectra produced by the digital-to-analog conversion process. The resultant output signal from low pass filter 45 is the transmitted signal $b(t)$ as shown in FIG. 1 and in FIG. 2.

In FIG. 1, transmitted signal $b(t)$ passes through representative bandlimited channel 50, whose impulse response is $c(t)$, resulting in channel output signal $s_a(t)$. In order to take into account the presence of noise in a communication system, FIG. 1 further depicts noise source 60, whose output represents the additive noise typically introduced by channel 50. Specifically, noise source 60 generates noise signal $v_a(t)$ which is shown as being added to the signal $s_a(t)$ in FIG. 1 to produce channel output signal $q_a(t) = s_a(t) + v_a(t)$. It is assumed that signal $v_a(t)$ is stationary Gaussian noise, but it may not necessarily be white (spectrally flat). The channel output signal $q_a(t)$ is applied to receiver 200, and may also be referred to as the 'received signal'.

The structure of receiver 200 is illustrated in FIG. 3. Within receiver 200, signal $q_a(t)$ is applied to analog bandpass filter 210. The function of filter 210 is to substantially reduce any energy in signal $q_a(t)$ outside of the transmission band of interest. The output signal of filter 210, $q_b(t)$, is applied to automatic gain control (AGC) circuit 215.

The output signal of AGC 215 is then sampled by analog-to-digital (A/D) converter 220 to form the digital signal $q_c[t]$.

Before continuing, we briefly describe our notation for digital signals. Hereafter we will denote all digital signals by using square brackets [ ] to enclose the time argument. It is understood that such a signal is equivalent to a sequence of impulses spaced at the appropriate sampling rate, e.g.

$$q_c[t] = \sum_{k=-\infty}^{\infty} q_c(t)\delta(t - kT_s) \tag{1}$$

where $q_c(t)$ in this case denotes the analog input signal to A/D converter 220, $\delta(.)$ denotes the Kronecker delta function $$\delta(x) \equiv \begin{cases} 0 & x \neq 0 \\ 1 & x = 0 \end{cases} \quad (2)$$

and $T_s$ is the reciprocal of the sampling frequency. In the case of this example, $1/T_s$ happens to be the A/D converter sampling rate.

In accordance with the present invention, a synchronous cyclostationary signal $z[t]$ is additively combined, using adder 225, with signal $q_c[t]$ to form the signal $q_d[t]$, which becomes the input to phase-splitter 230. However, at this point, in order to facilitate the description of the invention, it is useful to digress somewhat and discuss the operation of the receiver with the assumption that cyclostationary signal $z[t]$, for the moment, is zero.

Phase-splitting filter 230 removes the negative frequency portion of signal $q_d[t]$. (The negative frequency portion of signal $q_d[t]$ constitutes the so-called 'alias' component of the signal, introduced when discarding the imaginary part of the signal $y(t)$, and is not required for recovery of the data symbols.) The resulting analytic (positive-frequency-only) signal $q_e[t]$ is complex.

The complex signal $q_e[t]$ is sampled at rate $p/T$ by sampler 235, where $p > 1 + \beta$. (The sampling rate $p/T$ will be referred to as the 'equalizer sampling rate'). The resultant signal $q_f[t]$ is the input signal to fractionally spaced equalizer (FSE) 240.

FSE 240 includes adaptive digital transversal filter 241 which has N adjustable complex tap coefficients, which we will denote $c_1, c_2, \ldots, c_N$. The output of FSE 240 is provided once per symbol interval by symbol rate sampler 270 as the sum of the products of these tap coefficient values and the corresponding samples $s_1, s_2, \ldots, s_N$, in the digital transversal filter's input sample delay line. Denoting the set of tap coefficients at time $nT$ by the N-vector $c_n$, and the set of samples as $s_n$, the output of FSE 240 $e_n$ at time $nT$ is $$e_n = \sum_{k=1}^{N} c_k s_k \quad (3a)$$

$$= c_n \cdot s_n \quad (3b)$$

where the "." denotes the scalar-or dot-product.

Since the input to the digital transversal filter 241 of FSE 240 is the digital signal $q_f[t]$, the delay line at time $nT$ contains the samples $$s_1 = q_f[nT] \quad (4a)$$

$$s_2 = q_f\left[nT - \frac{T}{p}\right] \quad (4b)$$

$$s_N = q_f\left[nT - (N-1)\frac{T}{p}\right] \quad (4c)$$

and so the output of FSE 240 at time $nT$ is $$e_n = \sum_{k=1}^{N} c_k q_f\left[nT - (k-1)\frac{T}{p}\right]. \quad (5)$$

Once each symbol interval, the output $e_n$ of FSE 240 is computed according to (5), and this value passes into decision element 245. The purpose of decision element 245 is to assign or 'map' the $e_n$ into one of the possible $2^m$ symbol values (i.e. constellation points) which could have been transmitted. This estimated symbol, denoted $\hat{a}_n$, is chosen to be that symbol from the signal constellation which is closest in Euclidean distance (as measured in the complex plane) to $e_n$.

The purpose of FSE 240 is to minimize the average difference between these estimates $\hat{a}_n$ and the actual transmitted symbols $a_n$, according to some error criterion, typically the mean-squared error (MSE)

$$MSE \equiv E\{|\epsilon_n|^2\} \quad (6)$$

where $$\epsilon_n \equiv e_n - \hat{a}_n \quad (7)$$

and $$E\{\cdot\}$$

denotes expectation over all received symbols. To this end, the tap coefficients of FSE 240 are adjusted or 'adapted' according to a rule which results in a set of tap coefficient values which has small MSE. Illustratively the update rule is the so-called Least Mean Square or Stochastic Gradient rule $$c_{n+1} = c_n + \alpha \epsilon_n s_n \quad (8)$$

where the parameter $\alpha$ is known as the adaptation step size, and determines the rate at which adaptation proceeds. After the adaptation algorithm has been applied for a number of symbols, FSE 240 is said to be 'converged'; that is, its tap coefficients have been adjusted so that the MSE is very close to the minimum value which can be obtained. However, because the characteristics of the transmission channel may vary slowly over time, it is common practice to allow the adaptation algorithm to continue, using a small step size, in order to track any channel changes which may occur, i.e. to maintain a tap coefficient setting which is very close to the minimum MSE value which can be obtained.

It is well known that, in theory, there is a unique optimum tap coefficient setting, say $c_{opt}$, which minimizes the MSE for a given channel. However, there exist a large number of suboptimal tap coefficient settings which result in MSE values which are only slightly larger than the optimum setting. In any real-world system, due to noises which are invariably present, the tap coefficient settings for any type of adaptive equalizer will rarely maintain $c_{opt}$ exactly, even if the channel is not time-varying. Instead, the tap coefficients typically hop around randomly between some of the slightly suboptimal settings. In some implementations of equalizers, there may even exist small biases in the arithmetic operations which are performed on the tap coefficients as part of the update algorithm. These biases may result in, rather than a random hopping between suboptimal settings, a general 'drift' of the tap coefficients towards some particular slightly suboptimal setting.

This is because such biases affect each tap coefficient exactly the same way at each update, and so can have a cumulative effect in the same direction. However, regardless of the cause, the additional MSE engendered by these slightly suboptimal settings is negligible.

However, there is a significant practical problem with this bias-induced 'coefficient drift' when it occurs in a fractionally spaced equalizer. Suppose that for a particular channel, the minimum MSE tap coefficient setting for an FSE is $c_{opt}$. Denote the set of 'negligibly suboptimal' FSE tap coefficient vectors for this channel as $C_{ns}$. Each member of this set is a tap coefficient vector which results in a mean-squared error which is within some arbitrarily small increment of the MSE obtained using $c_{opt}$.

Recall that the Euclidean norm of an arbitrary complex N-vector x is denoted $||x||$ and defined $$||x|| = \left[ \sum_{i=1}^{N} |x_i|^2 \right]^{\frac{1}{2}}.$$

It is easy to see that in order to increase $||x||$, at least some of the elements of x must also increase. (We will hereafter simply use 'norm' to denote Euclidean norm.)

It can be shown that for an FSE, there will in general be members of $C_{ns}$ with norm much larger than $c_{opt}$. This means that some of the individual tap coefficient values of these 'large-norm' tap coefficient vectors are much larger than the corresponding values of $c_{opt}$. For an FSE then, some of these suboptimal tap coefficient vectors, although close to $c_{opt}$ in the MSE sense, can be very far from $c_{opt}$ in terms of the actual tap coefficient values.

Now consider the effect of these observations upon operating FSE 240, with the additional assumption that FSE 240 has biases in the update arithmetic. Even if FSE 240 initially converges to a tap coefficient vector whose norm is close to that of $c_{opt}$ (and it can be shown that this is in fact the case) it can now be appreciated that the aforementioned biases can slowly drive it away from this initial solution towards a solution which potentially has much larger tap coefficients than $c_{opt}$, even though the MSE may remain very close to the optimum value. In a practical implementation, this drift towards ever-larger tap coefficient values can eventually cause one or more of the tap coefficient registers to overflow. In some implementations, depending on the way in which arithmetic overflows are handled, this can cause a sudden catastrophic increase in the MSE; in any case it is very damaging and must be avoided.

The discussion of receiver 200 has so far been entirely handled in the time domain, e.g. describing the operation of FSE 240 in regard to the time domain tap coefficient vector. This was done in order to allow description of the 'large-norm' phenomenon in terms of the actual implementation of an FSE. In order to appreciate the principle of the invention in a clearer way, it is now advantageous to discuss the above 'large-norm' phenomenon in the frequency domain.

Recall that signal $q_a(t)$ at the receiver input consists of two components, the 'desired signal' $s_a(t)$, and the additive noise signal $v_a(t)$, i.e. $q_a(t) = s_a(t) + v_a(t)$. The 'desired signal' component, $s_a(t)$, is simply the transmitted waveform convolved with the channel transfer function, and the Fourier transform of signal $s_a(t)$ will be denoted as $S_a(f)$. The noise component signal $v_a(t)$ is, as we have mentioned, assumed to be stationary Gaussian noise introduced by the channel and its power spectrum will be denoted $N_a(f)$.

FIGS. 4 to 9 show the power spectra of the signal and noise components at the points labeled a-f in receiver 200 of FIG. 3. Subscripts a-f are used on all signals to reflect the location of the signal in receiver 200. FIG. 4 depicts the power spectra at the receiver input, with signal $q_a(t) = s_a(t) + v_a(t)$, as described above. In FIG. 4, $|S_a(f)|^2$ represents the power spectrum of the digital 'desired signal' component, and $N_a(f)$ represents the power spectrum of the noise component. As with any real-valued signal, $|S_a(f)|^2$ is symmetric about DC. The positive passband, or 'in-band' frequency region of $|S_a(f)|^2$ extends from $f_{min}$ to $f_{max}$, where $f_{max} - f_{min} = (1+\beta)/T$ Hz, and its 'image' appears symmetrically below DC. Within the positive passband, $|S_a(f)|^2$ is nonzero, while outside this band the signal has negligible power, above DC.

Now consider the noise spectrum $N_a(f)$ at the input to receiver 200. In theoretical telephone channel models, it is often assumed that $N_a(f) = N_0$, a constant, and that its bandwidth is infinite. However, in the real world, the noise spectrum at the receiver input, although usually rather flat and wider in bandwidth than the received signal, nevertheless does roll off considerably beyond the high frequency end of the signal spectrum, as shown in FIG. 4. Furthermore, analog bandpass filter 210 at the receiver input is typically designed so as to block frequencies that are outside the transmitter's passband just for this reason- to minimize the total noise seen by the rest of the receiver. Considering both of these factors then, it is not unusual in practice that the output of bandpass filter 210 contains very little noise at frequencies much above $f_{max}$. This situation is shown in FIG. 5.

Now consider the sampled versions of these same spectra, i.e. following A/D converter 220 (FIG. 6). Let the sampling rate of A/D converter 220 be $1/T_s$, and we assume that $1/T_s > 2f_{max}$, so that the A/D conversion does not introduce aliasing of the received signal. Since this is now a sampled system, we need only consider the spectra in the band $-\frac{1}{2}T_s$ to $\frac{1}{2}T_s$ since the spectrum of any sampled signal is periodic in frequency, with period equal to the sampling rate.

For the present, it is still assumed that signal $z[t] = 0$, so that the spectra after adder 225 is identical to the output of A/D converter 220 as shown in FIG. 7.

FIG. 8 shows the power spectra at the output of phase-splitter 230. Only the positive portions of the noise and signal spectra remain, the negative frequency components having been suppressed by the phase splitter as previously discussed.

FIG. 9 shows the spectra after the analytic signal $q_e[t]$ is resampled at the equalizer's input rate $p/T, p > 1 + \beta$. (In practice, $p/T$ is usually an integer submultiple of $1/T_s$ so that resampling the phase-splitter output at rate $p/T$ does not require interpolation. Illustratively, we have shown the situation for $p = 2$, and with the positive passband located so that $p/T > f_{max}$ as well. This simplifies the depiction of the spectra. However, it is not necessary that $p/T > f_{max}$.) Since this sampling rate is larger than the bandwidth of both $S_e[f]$ and $N_e[f]$, there is a 'no-energy' or 'out-of-band' region in which both the signal and the noise power are negligible. The out-of-band region is at least as large as the difference between the bandwidth of analog bandpass filter 210 and $p/T$, the equalizer sampling frequency. Depending on the channel transfer function and the noise spectrum $N_a(f)$, it may be larger than this.

This out-of-band region is really at the heart of the tap coefficient-drift problem experienced by an FSE, illustratively represented by FSE 240. Recall that the adaptation algorithm of FSE 240 strives to minimize the mean-squared error at the equalizer output. The mean-squared error at the output of FSE 240 is composed of two components: noise, and 'residual intersymbol interference' (ISI). If we denote the frequency domain transfer function of FSE 240 as E(f), then the component of the output MSE due to noise is simply $$MSE_{noise} = \int_0^{p/T} N_d[f]|E[f]|^2 df \quad (9)$$

while the residual ISI is $$MSE_{isi} = \int_0^{1/T} \left| \sum_{k=-\infty}^{\infty} S_d[f + k/T]E[f + k/T] - 1 \right|^2 df \quad (10)$$

It is not necessary to dwell on the details of (9) and (10); it is sufficient to simply observe that $MSE_{noise}$ depends only on the product $|E[f]|N_d[f]$, while $MSE_{isi}$ depends only on the product $E[f]S_d[f]$. Consequently, if there exist frequencies for which $S_d[f]$ and $N_d[f]$ are both zero, then the value of $E[f]$ at these frequencies has no effect on the output MSE, because the products are zero regardless of $E(f)$.

This is just the situation in the out-of-band region of the FSE-there may be very small components of signal or noise (or both) but they are negligible-hence the FSE is essentially unconstrained on that region. It can build nearly any response at all there, without significantly affecting the MSE.

This region of nearly complete freedom is closely related to the set $C_{ns}$, of 'negligibly suboptimal' tap coefficient vectors. Recall that the optimum equalizer tap coefficient vector is $c_{opt}$, and denote its Fourier transform (i.e. its transfer function) as $E_{opt}[f]$. Clearly then, any other equalizer setting c' whose transfer function is approximately the same as $E_{opt}[f]$ for all f in-band, will have the nearly the same MSE as $c_{opt}$; yet its frequency response for out-of-band values of f can be arbitrary. Each such c' is thus, by definition, a member of $C_{ns}$.

A fundamental relationship which holds between any arbitrary vector x and its Fourier transform $X[f]$ is the so-called Parseval relation $$||x||^2 = \int_0^{1/T} |X(f)|^2 df.$$

Loosely speaking then, if the power spectrum of a vector is 'large', then the norm of the vector will be also, i.e. some tap coefficients take on large values. This allows us finally to relate the FSE's out-of-band region to the large norm problem: Those members of $C_{ns}$ which have large norm are precisely those c' which have large out-of-band response. The aforementioned biases can thus be understood in frequency domain as causing the eventual buildup (taking perhaps millions of symbol intervals) of a large out-of-band response of the equalizer.

In accordance with the above-cited U.S. Pat. No. 4,376,308 by McNair, an additional signal, derived from the data signal, is added to the phase-splitter input signal $q_d(t)$. This additional signal has energy in the out-of-band region. The presence of the added energy in the out-of-band region means that, if the tap coefficient values now start to drift causing the gain of an equalizer transfer function to increase in the out-of-band regions, the contribution to the mean-squared error of the energy in the out-of-band region will be non-negligible. The tap coefficient updating algorithm responds by adjusting the tap coefficients so as to maintain zero or small response in the out-of-band region. This in effect eliminates from the set $C_{ns}$ those tap coefficient vectors which have large norm, thus alleviating the tap coefficient drift. However, the spectrum of the additional signal in the McNair patent must be substantially restricted to the out-of-band region in order not to overlap with the desired signal spectrum $S_d(f)$ and thus increase $MSE_{noise}$, the mean-squared error due to noise. A consequence of this property is that the filters used to generate the additional signal need particularly sharp rolloff characteristics, consequently consuming additional processing power. Furthermore, the additional signal is generated in the analog domain, requiring additional receiver circuitry.

However, I have realized, that the injection of a frequency synchronous cyclostationary signal can also eliminate the tap coefficient drift and with a reduction in the attendant processing requirements. This reduction in processing requirements is due in part to the fact that the cyclostationary signal does not have to be substantially restricted to the out-of-band region. In fact it can be present in the same frequency band as occupied by the desired signal and yet cause negligible increase in the mean squared error provided the power of the cyclostationary signal is larger out-of-band than in-band. A consequence of this property is that the filters used to generate the cyclostationary signal do not need particularly sharp roll-off characteristics, and so can be far simpler, reducing the processing requirements. Furthermore, the cyclostationary signal is very simple to produce digitally, requiring no additional hardware, e.g. the cyclostationary signal can be generated by a digital signal processor which is typically already present in the receiver. Therefore, in accordance with the invention, tap coefficient drift in a fractionally spaced equalizer can be constrained by equalization of a composite signal which is formed by combining a data signal with a frequency synchronous cyclostationary signal having energy in at least the out-of-band frequency regions, and where the energy of the cyclostationary signal in the in-band region is less than the energy in the out of band region.

At this point, it would be useful to digress and present some background on the frequency domain properties of cyclostationary signals.

Any signal which can be represented in the form $$x(t) = \sum_{n=-\infty}^{\infty} d_n h(t - nT_0) \quad (11)$$

where the $d_n$ are independent, zero-mean random variables, is said to be cyclostationary, with period $T_0$. It can be seen that (11) has the same form as a general linearly modulated data signal where $(d_n)_{-\infty}^{\infty}$ is the data symbol sequence, signal h(t) is the channel impulse response, and $1/T_0$ is the symbol rate. In general, the sequence $(d_n)_{-\infty}^{\infty}$ will not possess a Fourier transform.

However, we can segment the infinite sequence into 'messages' of some arbitrary but finite length, and define the time-domain impulse sequence corresponding to each message, i.e.

$$d_l(t) \equiv \sum_n d_n \delta(t - nT_0) \quad (12)$$

where subscript l denotes the l-th message, and the summation is understood to be only over the indices n corresponding to the l-th message segment of $(d_n)_{-\infty}^{\infty}$. If we denote the Fourier transform of the signal $d_l(t)$ as $D_l(f)$, and the Fourier transform of signal h(t) as H(f), then we can write (11) in the frequency domain as $$X_l(f) = D_l(f)H(f) \quad (13)$$

We can now show some simple frequency-domain properties of such 'truncated' cyclostationary signals:

First, Fourier transforms of the 'messages' $d_l(t)$ are periodic with period $1/T_0$:

$$D_l(f + k/T) = D_l(f) \text{ for all integers } k. \quad (14)$$

Recall that the Fourier transform of any signal f(t) sampled at times $nT_0$ is the folded sum of adjacent $1/T_0$ width 'slices' of F(f), i.e.

$$\sum_{k=-\infty}^{\infty} F(f + k/T).$$

Thus, because of property (15), the $nT_0$-sampled cyclostationary signal $X_l(f)$ can be factored as $$\sum_{k=-\infty}^{\infty} X_l(f + k/T) = D_l(f) \sum_{k=-\infty}^{\infty} H(f + k/T). \quad (15)$$

In FIG. 3, z[t], a cyclostationary signal, is illustratively produced by cyclostationary signal generator 250 and added to the A/D output signal $q_c[t]$ to product signal $q_d[t]$. Cyclostationary generator 250 is composed of digital sequence generator 250 and digital shaping filter 260, whose sampling rate is $1/T_s$, the sampling rate of A/D converter 220, where illustratively $T_s = T/M$ for some integer M. Signal u[t] provided by 255 is the digital equivalent of a symbol-rate impulse sequence, i.e. samples of signal u[t] are of the form $$u[t] = \ldots, u_n, 0,0,0, \ldots, 0, u_{n+1}, 0,0, \ldots, u_{n+2}, \ldots \quad (16)$$

where nonzero 'impulse samples' $u_n$ are interspersed with exactly M−1 'zero samples'. Thus, the interval between successive impulse samples is one symbol interval T. The impulse samples can be generated illustratively by a pseudo-random sequence generator. Alternatively, a pseudo-random sequence of impulse samples can be stored in memory and read out once every T seconds. Shaping filter 260 can illustratively be a typical finite-impulse response digital filter with L taps, and tap spacing $T_s$. However, since the input sequence u[t] is nonzero only at every Mth sample, computing the output of filter 260 requires only L/M multiply/accumulate operations per output sample rather than the L such operations which would be required for a general input sequence.

We can now apply properties (14) and (15) to the two cyclostationary signals of interest in the system: The data signal at the input to the phase splitter signal $s_d[t]$, and the cyclostationary constraint signal z[t]. (To simplify the notation below, the l-th message index will always be assumed so that we can freely take Fourier transforms.)

At the input to the phase splitter, the 'desired signal' portion $s_d[t]$ of signal $q_d[t]$ can be represented as the complex cyclostationary signal $$s_d[t] = \sum_n a_n g(t - nT) \quad (17)$$

where the $a_n$ are the transmitted data symbols, and signal g(t) represents the convolution of all filtering operations in the system, assumed to include the transmitter through the all receiver circuitry preceding the phase splitter. If we let A(f) denote the Fourier transform of the l-th message impulse sequence, and G(f) the Fourier transform of signal g(t), then (17) can be expressed in frequency domain as $$S_d[f] = A(f)G(f) \quad (18)$$

Similarly, if we let U[f] denote the Fourier transform of signal u[t], the cyclostationary generator impulse sequence (16), and let W[f] be the transfer function of cyclostationary filter 260, then the Fourier transform of the cyclostationary constraint signal z[t] is just $$Z[f] = U[f]W[f]. \quad (19)$$

In the frequency domain then, the input to the equalizer is $Z[f] + S_d[f] + N_d[f]$. At high signal-to-noise ratios encountered in practice, it is well known that the noise component $N_d[f]$ has a relatively small effect on the optimum equalizer setting, so we will eliminate it from consideration in what follows. This facilitates a somewhat simpler explanation of the effect of the cyclostationary signal Z[f] upon the equalizer. With this assumption, the output of equalizer 240 prior to symbol-rate sampler 270 can be approximately represented as $$R[f] = E[f](S_d[f] + Z[f]) \quad (20a)$$

$$= E[f]A[f]G[f] + E[f]U[f]W[f] \quad (20b)$$

Following the sampler, we can make use of (15), so that $$\sum_k R[f + k/T] = A[f] \sum_k E[f + k/T]G[f + k/T] + \quad (21)$$

$$U[f] \sum_k E[f + k/T]W[f + k/T]$$

where the summation is understood to be from $-\infty$ to $\infty$. This is just the frequency domain representation of the output of the system, and we would of course like this to be the 'message' sequence, whose Fourier transform is A(f). Thus, the equalizer's task, in the frequency domain, can be simply stated as that of determining an E[f] which satisfies $$A[f] \sum_k E[f + k/T]G[f + k/T] + \quad (22)$$

-continued $$U[f] \sum_k E[f + k/T]W[f + k/T] = A[f].$$

If the cyclostationary impulse sequency $\{u_n\}$ is uncorrelated with the message data sequency $\{a_n\}$, then it can be shown that, in general, in order for (22) to be satisfied, E[f] must satisfy both $$\sum_k E[f + k/T]G[f + k/T] = 1 \quad (23a)$$

and $$\sum_k E[f + k/T]W[f + k/T] = 0 \quad (23b)$$

simultaneously for all f. If these conditions can be satisfied, then (in the absence of noise, as we have assumed here) the recovered data sequence will be identical to the transmitted sequence.

Note that, in the absence of the constraint signal z[t], the only requirement on E[f] is (23a). But (23a) can be recognized as the frequency domain form of the first Nyquist criterion for zero intersymbol interference: The folded overall channel from input to output must be constant.

On the other hand, constraint equation (23b) is a separate independent condition which must also be satisfied. Thus, (23b) represents, in the frequency domain, the way in which the signal z[t] constrains E[f]. We will now show how, if W[f] is properly chosen, this constraint can have the effect of maintaining the out-of-band response at a low level, yet without requiring that W[f] be limited to the out-of-band region.

Assume the FSE has tap spacing T/2, so that the frequency range of interest (following the phase splitter) is from DC to 2/T. At a particular in-band frequency $f_0$ there is a corresponding out-of-band frequency $f_1 = f_0 + 1/T$. If equation (23b) is solved for $E[f_1]$—that is, the response of the fractionally spaced equalizer at the out-of-band frequency $f_1$—it can be seen that $$E[f_0 + 1/T] = \frac{W[f_0]E[f_0]}{W[f_0 + 1/T]} \quad (24)$$

or $$E[f_1] = E[f_0]\left(\frac{W[f_0]}{W[f_1]}\right) \quad (25)$$

From this equation it can be seen that, in accordance with the invention, as long as $W[f_0] < W[f_0 + 1/T]$, over the range of in-band frequencies (i.e., the cyclostationary noise injected in-band is less than that injected out-of-band) then the response of the equalizer will always be smaller out-of-band than in-band. Thus, the equalizer's out-of-band response is constrained in the desired manner so as to mitigate the tap coefficient drift problem. The degree of suppression of the tap coefficient drift is dependent on the ratio of the out-of-band power to the in-band power.

FIG. 10 illustrates typical values at the frequencies of $f_0$ and $f_1$ for the magnitudes of the signal transfer function G[f] and filter transfer function W[f], (23a) and (23b) require that $$1.0E[f_0] + 0.0001E[f_1] = 1$$

$$0.01E[f_0] + 0.1E[f_1] = 0$$

Solving these equations simultaneously, it can be verified that $E[f_0] = 0.99999$, and $E[f_1] = 0.099999$. Thus, in accordance with the invention, the injection of frequency synchronous cyclostationary noise into both the in-band and out-of-band regions constrains the out-of-band frequency response of a fractionally-spaced equalizer.

Figure 11:
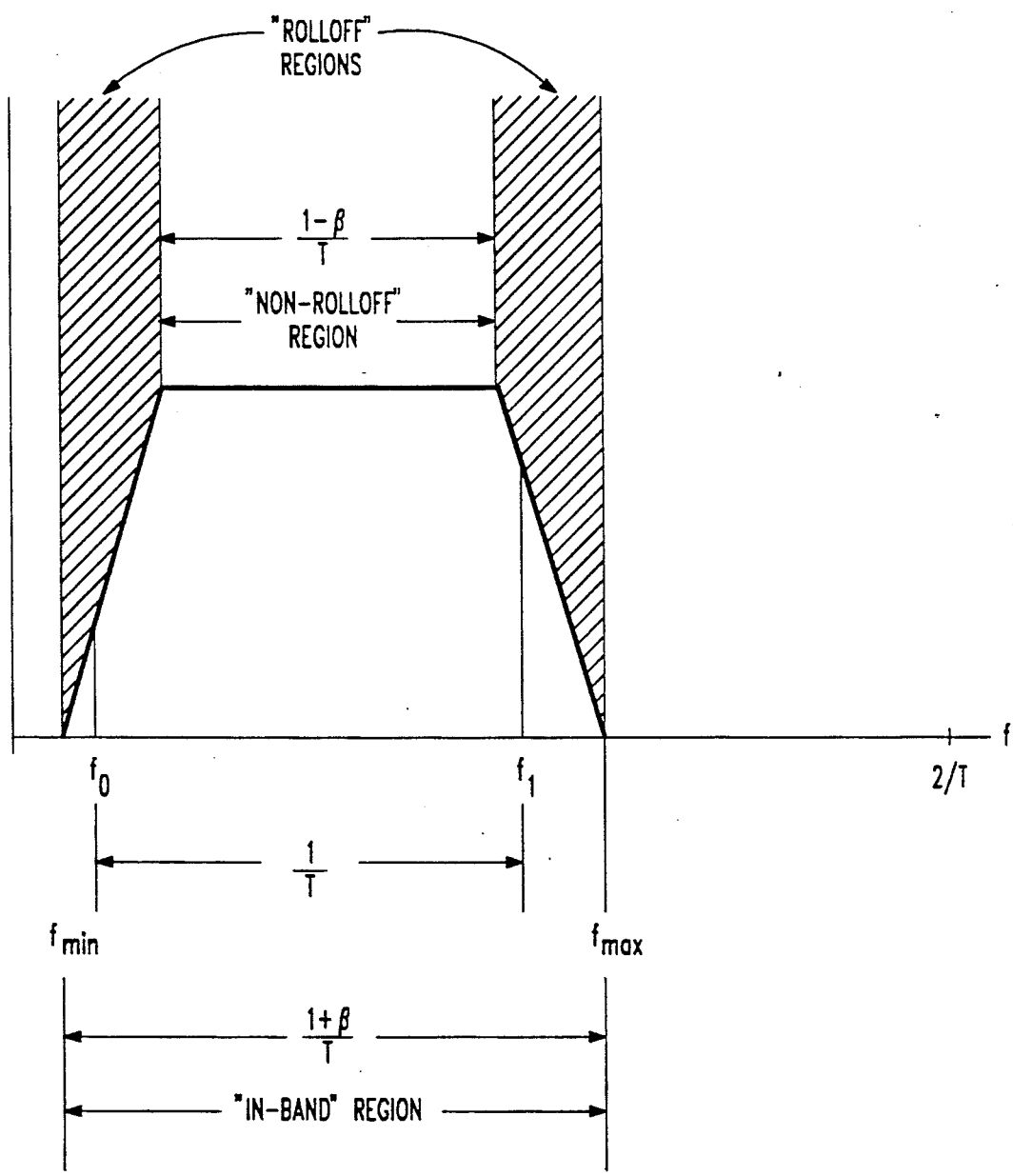
FIG. 11 is an illustrative signal amplitude vs. frequency plot helpful in explaining the operation of the invention in response to a data signal with an excess bandwidth of $\beta$ and sampled at an equalizer rate of $2/T$.

While the foregoing illustrates the basic inventive concept it may be necessary in some communications systems which have large excess bandwidth or roll-off factor $\beta$, to take other effects into account in forming the composite signal. Such a system is illustrated in FIG. 11, showing the spectrum of the received data signal in a system which has a roll-off factor $\beta \approx 0.5$ and equalizer sampling rate 2/T. As can be seen from FIG. 11, the data signal's spectrum can be divided into a non-roll-off and a roll-off region. It can be seen that for any $f_0$ in one of the roll-off regions, the corresponding 'folded' frequency $f_1 = f_0 + 1/T$ lies in the other roll-off region. Thus, neither $f_0$ nor $f_1$ is strictly out-of-band. When this situation is true over a significant range of frequencies, i.e. when $\beta$ is fairly large, it may be advantageous to design shaping filter 260 so as to attenuate the range of frequencies in both the roll-off regions. Though requirements of a sharper filter design are now imposed on the system, it should be noted that the especially simple means of generating the cyclostationary constraint signal z[t] still provide an attractive alternative to the prior art.

Since even when sharp filtering requirements are imposed on the system the use of a cyclostationary signal still affords some advantages, an additional option, in the use of a cyclostationary signal to constrain the tap coefficient drift of a fractionally spaced equalizer, is to limit the in-band energy of the cyclostationary signal to a negligible value. As a result, $W(f_0)$ at any particular in-band frequency will be approximately zero.

The foregoing merely illustrates the principles of the invention. Although the invention is illustrated in the context of a system in which each data symbol is represented by data signal values transmitted in a single interval T, it is equally applicable to systems in which a data symbol is represented by data signal values transmitted in two or more such intervals. Furthermore, it should be recognized that the techniques described herein are applicable to any linearly modulated data transmission format, e.g. QAM, PAM, PSK, DPSK. Finally, it should also be recognized that a synchronous cyclostationary signal can be produced in different ways and added at different points of the communication system to the desired signal, some of which can be more advantageous than others. Thus it will be appreciated that those skilled in the art will be able to devise numerous arrangements which, although not explicitly disclosed herein, embody the principles of the invention.

I claim:

1. A method for processing a data signal for equalization by a fractionally spaced equalizer, the data signal representing a sequence of data signal values occurring at T second intervals and comprised of energy in the in-band frequency region of the equalizer, the method comprising the steps of:

forming a synchronous cyclostationary signal, the cyclostationary signal representing a succession of cyclostationary signal values occurring at T second intervals and comprised of energy in at least the out-of-band frequency region of the equalizer; and
combining the cyclostationary signal and the data signal to form a composite signal whereby equalization of the composite signal constrains the tap coefficient drift of the equalizer.

2. The method of claim 1 wherein the cyclostationary signal forming step comprises the further steps of:
forming a sequence of impulse signals occurring at T second intervals, each impulse signal representing a psuedo-random data value; and
shaping the sequence of impulse signals to form the cyclostationary signal such that the cyclostationary signal includes substantial energy in the in-band frequency region.

3. The method of claim 1 wherein the data signal and the cyclostationary signal are passband signals.

4. A method for processing a data signal for equalization by a fractionally spaced equalizer, the data signal representing a sequence of data signal values occurring at T second intervals and comprised of energy in the in-band frequency region of the equalizer, the method comprising the steps of:
forming a synchronous cyclostationary signal, the cyclostationary signal representing a succession of cyclostationary signal values occurring at T second intervals and comprised of energy in the in-band and out-of-band frequency regions of the equalizer, the energy in the in-band region being less than the energy in the out-of-band region; and
combining the cyclostationary signal and the data signal to form a composite signal, whereby equalization of the composite signal constrains the tap coefficient drift of the equalizer.

5. The method of claim 4 wherein the cyclostationary signal forming step comprises the further steps of:
forming a sequence of impulse signals occurring at T second intervals, each impulse signal representing a psuedo-random data value; and
shaping the sequence of impulse signals to form the cyclostationary signal such that the cyclostationary signal includes substantial energy in the in-band frequency region.

6. The method of claim 4 wherein the data signal and the cyclostationary signal are passband signals.

7. A method for processing a data signal for equalization by a fractionally spaced equalizer, the data signal with a roll-off factor of $\beta$, $\beta \geq 0$, and representing a sequence of data signal values occurring at T second intervals, the data signal comprised of energy in the in-band frequency region of the equalizer, the method comprising the steps of:
forming a synchronous cyclostationary signal, the cyclostationary signal representing a succession of cyclostationary signal values occurring at T second intervals and comprised of energy in the non-roll-off frequency region of data signal and the out-of-band frequency region of the equalizer, where the energy in the non-roll-off region is less than the energy in the out-of-band region; and
combining the cyclostationary signal and the data signal to form a composite signal, whereby equalization of the composite signal constrains the tap coefficient drift of the equalizer.

8. The method of claim 7 wherein the cyclostationary signal forming step comprises the further steps of:
forming a sequence of impulse signals occurring at T second intervals, each impulse signal representing a psuedo-random data value; and
shaping the sequence of impulse signals to form the cyclostationary signal such that the cyclostationary signal includes substantial energy in the in-band frequency region.

9. The method of claim 7 wherein the data signal and the cyclostationary signals are passband signals.

10. Apparatus for processing a data signal for equalization by a fractionally spaced equalizer, the data signal representing a sequence of data signal values occurring at T second intervals and comprised of energy in the in-band frequency region of the equalizer, the apparatus comprised of:
means for generating synchronous cyclostartionary signals, the cyclostationary signal representing a succession of cyclostationary signal values occurring at T second intervals and comprised of energy in the in-band and out-of-band frequency regions of the equalizer, where the energy in the in-band region is less than the energy in the out-of-band region; and
means for combining the cyclostationary signal and the data signal to form a composite signal.

11. The apparatus of claim 10 being further comprised of means for equalizing the composite signal, whereby equalization of the composite signal constrains the tap coefficient drift of the equalizer.

12. The apparatus of claim 10 wherein the generating means is further comprised of:
means for providing a sequence of impulse signals occurring at T second intervals, each impulse signal representing a psuedo-random data value; and
means for shaping the sequence of impulse signals for providing the cyclostationary signal such that the cyclostationary signal includes substantial energy in the in-band frequency region.

13. The apparatus of claim 10 wherein the data signal and the cyclostationary signal are passband signals.

14. Apparatus for processing a data signal for equalization by a fractionally spaced equalizer, the data signal representing a sequence of data signal values occurring at T second intervals and comprised of energy in the in-band frequency region of the equalizer, the apparatus comprised of:
means for generating synchronous cyclostationary signal, the cyclostationary signal representing a succession of cyclostationary signal values occurring at T second intervals and comprised of energy in at least the out-of-band frequency region of the equalizer; and
means for combining the cyclostationary signal and the data signal to form a composite signal.

15. The apparatus of claim 14 having further comprised a means for equalizing the composite signal, whereby equalization of the composite signal constrains the tap coefficient drift of the equalizer.

16. The apparatus of claim 14 wherein the generating means is further comprised of:
means for providing a sequence of impulse signals occurring at T second intervals, each impulse signal representing a psuedo-random data value; and
means for shaping the sequence of impulse signals for providing the cyclostationary signal such that the cyclostationary signal includes substantial energy in the in-band frequency region.

17. The apparatus of claim 14 wherein the data signal and the cyclostationary signal are passband signals.

18. Apparatus for processing a data signal for equalization by a fractionally spaced equalizer, the data signal with a roll-off factor of $\beta$, $\beta \geq 0$, and representing a sequence of data signal values occurring at T second intervals, the data signal comprised of energy in the in-band frequency region of the equalizer, the apparatus comprised of:

means for generating a synchronous cyclostationary signal, the cyclostationary signal representing a succession of cyclostationary signal values occurring at T second intervals and comprised of energy in the non-roll-off frequency region of the data signal, and the out-of-band frequency region of the equalizer, where the energy in the non-roll-off region is less than the energy in the out-of-band region; and means for combining the cyclostationary signal and the data signal to form a composite signal, whereby equalization of the composite signal constrains the tap coefficient drift of the equalizer.

19. The apparatus of claim 18 wherein the generating means is further comprised of:

means for providing a sequence of impulse signals occurring at T second intervals, each impulse signal representing a psuedo-random data value; and means for shaping the sequence of impulse signals for providing the cyclostationary signal such that the cyclostationary signal includes substantial energy in the in-band frequency region.

20. The apparatus of claim 18 wherein the data signal and the cyclostationary signals are passband signals.

21. Apparatus for processing a data signal transmitted to the apparatus, the data signal representing a succession of data signal values occurring at T second intervals and comprised of energy in a first frequency region of width $(1+\beta)/T$, $\beta \geq 0$, where $\beta$ is the roll-off factor of the data signal and the first frequency region is further comprised of a non-roll-off and a roll-off frequency region, the apparatus comprising:

means for generating a synchronous cyclostationary signal representing a succession of cyclostationary signal values occurring at T second intervals and comprised of energy in the non-roll-off frequency region of the data signal and the out-of-band frequency region of the equalizer where the energy in the non-roll-off region is less than the energy in the out-of-band region;

signal combining means for combining the cyclostationary signal and the data signal for providing a composite signal;

means for sampling the composite signal for providing a sampled signal comprised of a succession of samples occurring at a predetermined rate of p/T, p>1, samples per second, the sampled signal being comprised in the frequency domain of periodic replicas of the composite signal distributed in a plurality of frequency bands;

fractionally spaced equalizer for equalizing a sampled signal, whereby the tap coefficient of the equalizer is constrained; and means for repetitively updating the response of the equalizer.

22. The apparatus of claim 21 further comprising means for recovering the data signal values from the equalized sampled signal.

23. The apparatus of claim 21 wherein the repetitively updating means updates the response of the equalizer according to a Least Mean Square rule.

24. The apparatus of claim 21 wherein the data signal and the cyclostationary signal are passband signals.

25. The apparatus of claim 24 wherein the cyclostationary signal generating means is further comprised of:

means for providing a sequence of impulse signals occurring at T second intervals, each impulse signal representing a psuedo-random data value; and means for shaping the sequence of impulse signals for providing the cyclostationary signal such that the cyclostationary signal includes substantial energy in the in-band frequency region.

* * * * *